May 5, 1970 T. D. MASON 3,510,008

TAPE CARTRIDGE HOLDER

Filed April 29, 1968

INVENTOR.
TERRY D. MASON

BY Fulwider, Patton, Rieber, Lee and Utecht

ATTORNEYS

United States Patent Office 3,510,008

Patented May 5, 1970

3,510,008

TAPE CARTRIDGE HOLDER

Terry D. Mason, 6432 Viking Circle, Huntington Beach, Calif. 92647

Filed Apr. 29, 1968, Ser. No. 724,918
Int. Cl. A47g *29/00*
U.S. Cl. 211—40 6 Claims

ABSTRACT OF THE DISCLOSURE

A tape cartridge holder for attachment to the underside of a vehicle dashboard and including resilient means engaged by the cartridge and tending to prevent the cartridge from sliding out of the holder.

BACKGROUND OF THE INVENTION

Field of the invention

The present invention relates to a holder for storing one or more magnetic tape cartridges of the type used in a tape deck or the like.

Description of the prior art

Stereo tape decks are presently available which are capable of detachably mounting a tape cartridge for running the tape past the playback heads. The cartridge is quickly detachable to receive another cartridge, as determined by the user's choice of the recorded material which he wishes to hear.

The usual cartridge of the type mentioned is generally rectangular, and with parallel opposite faces so that a plurality of such cartridges can easily be stacked one upon the other. However, simply stacking the cartridges is not practical in an automobile or the like because the vehicle movement will strew the cartridges everywhere. Placing the cartridges in a box which is attached to the vehicle interior is not a complete answer either, since the cartridges tend to rattle.

SUMMARY

According to the present invention, a holder is provided which can easily be attached to the underside of a vehicle dashboard for storing a number of magnetic tape cartridges out of the way, and yet in position for immediate withdrawal and use of any selected one of the cartridges.

The holder includes resilient means for engagement with the cartridges so that the cartridges are securely held in position, and without rattling against each other. However, the constraint against cartridge removal afforded by the resilient means can easily be overcome by simply pulling outwardly on the protruding portion of the selected cartridge. Guides may be provided for location and orientation of the stored cartridges, such as in stacked relation, and the resilient means is effective to maintain the stacked relation despite removal of a cartridge from the middle of the stack.

Other objects and features of the invention will become apparent from consideration of the following description taken in connection with the accompanying drawings in which:

DESCRIPTION OF THE PREFERRED EMBODIMENTS

Figures 1, 2, 3, 4, 5, 6:
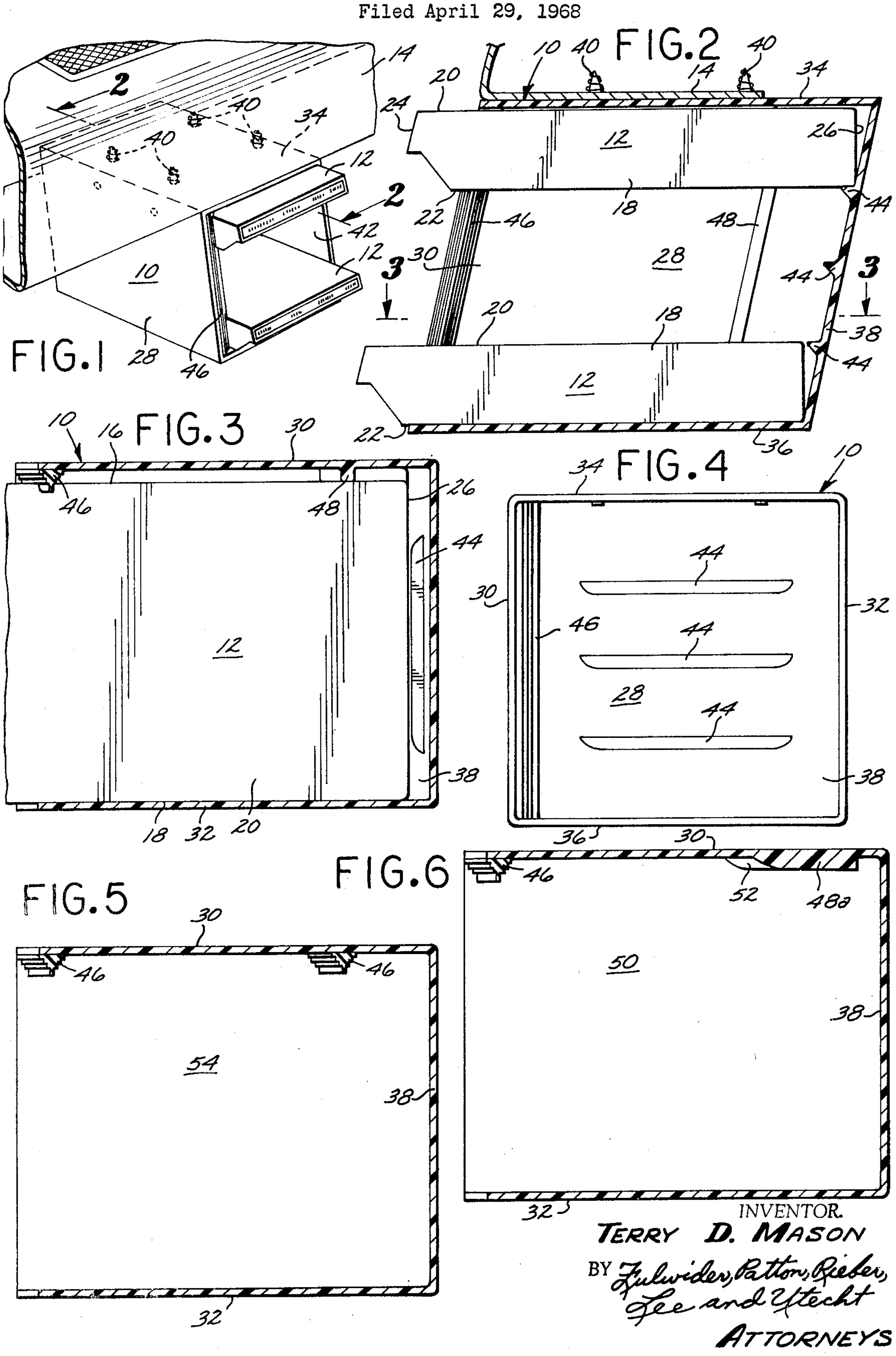
FIG. 1 is a perspective view of a cartridge holder according to the present invention, the holder being illustrated as holding two cartridges, and attached to the underside of an automobile dashboard, most of the dashboard being omitted for brevity.
FIG. 2 is an enlarged view taken along the line 2—2 of FIG. 1.
FIG. 3 is a view taken along the line 3—3 of FIG. 2.
FIG. 4 is a front end elevational view of the holder of FIG. 1, with the cartridges omitted.
FIG. 5 is a view similar to FIG. 3, but illustrating a second embodiment of the holder.
FIG. 6 is a view similar to FIG. 3, but illustrating a third embodiment of the holder.

Referring now to the drawings, and particularly FIGS. 1 through 4, there is illustrated a tape cartridge holder 10 according to the present invention. Although the holder 10 can be supported in any suitable manner, as by attachment to a wall or like supporting surface, it is particularly adapted for use in an automobile for storing a plurality of magnetic tape cartridges 12. In that application, the cartridges 12 are preferably vertically stacked on top of one another in "stair-step" fashion beneath the automobile dashboard, which is indicated generally at 14 in FIG. 1. With this arrangement the driver or passenger can easily remove a cartridge 12 from the holder 10 by simply reaching one hand beneath the dashboard and pulling outwardly upon the selected cartridge. As is well-known, the cartridge can then be inserted into the usual cartridge receiver of the playback unit or tape deck (not shown).

Tape decks for playing the tapes of such type cartridges are widely available and well-known. Consequently, they form no part of the present invention and will not be described, other than to note that the ease with which they accept cartridges requires that a suitable storage holder permit the same ease of cartridge insertion and withdrawal.

The typical magnetic tape cartridge 12 is generally rectangular in configuration, with somewhat rounded corners, and houses magnetic tape (not shown) in its hollow interior. The cartridge 12 includes substantially parallel sides 16 and 18, substantially parallel upper and lower walls or faces 20 and 22, and substantially parallel front and back 24 and 26.

The holder 10 includes a receptacle 28 having substantially parallel sides 30 and 32, substantially parallel top and bottom 34 and 36, and a rear wall 38 sloping rearwardly from bottom to top, as best illustrated in FIG. 2. In addition, the front edges of the sides 30 and 32 are generally parallel to the rear wall 38, having a similar inclination or slope.

The top 34 is provided with a plurality of openings adapted to receive a corresponding plurality of self-tapping metal screws 40 or similar fasteners for attachement of the holder 10 to the underside of the automobile dashboard 14. In this mounted position of the holder 10, the top and bottom 34 and 36 are horizontally disposed and the sides 30 and 32 are generally vertically disposed. With this orientation the plurality of cartridges 12 can be stacked upon one another within the hollow interior or cartridge space 42 of the holder 10 in stair-step fashion.

The rear wall 38 preferably includes a plurality of integral, horizontally oriented and vertically spaced apart ledges which are each adapted to engage and support the lower back corner of one of the cartridges 12. The lowermost cartridge 12 rests upon the receptacle bottom 36.

Each side 16 of the cartridges 12 is yieldably engaged by resilient means taking the form of an elongated resilient strip 46 located adjacent the front edge of the receptacle side 16 and having its base portion preferably adhesively secured in position. The strip 46 slopes or is inclined rearwardly from bottom to top in the same manner as the front edges of the receptacle sides. The lesser cross section or thinner inner edge portion of the strip 46 projects from the strip base portion into the cartridge space, as best seen in FIG. 3.

The resilience of the strip 46 is preferably made sufficiently great that its bias upon the stacked cartridges 12 resiliently supports the cartridges between the receptacle sides 30 and 32 without allowing any of the cartridges 12 to drop, despite the fact that a lower one of the cartridges may have been withdrawn. However, the same bias can easily be overcome by the user to remove a cartridge. The user simply grasps the front of the individual cartridge and pulls it outwardly against the bias of the strip 46.

A strip 46 having the requisite resilience can be formed out of a length of the rubber material used in a conventional automobile windshield wiper. The end portion or blade of the wiper is deflectable rearwardly by a cartridge, as best seen in FIG. 1. Of course, other resilient materials may also be utilized if desired.

In the embodiment of the holder 10 illustrated in FIGS. 1 through 4, the rearward portion of each of the cartridges is guided into proper position during insertion, and held in this position, by an elongated rib 48 which is integral with the receptacle side 16. The rib 48 projects inwardly for engagement with the sides of the cartridges, and is located between the resilient strip 46 and the receptacle rear wall 38, preferably closer to the rear wall 38 for better support of the cartridges.

In FIG. 6 there is illustrated a holder 50 which is identical in every respect to the holder 10 just described, except that the rib 48 is made considerably wider, as indicated generally at **48*a*, and includes an inclined front edge defining a ramp 52 which is engageable with the back corners of the cartridges 12 to guide them into proper position during their insertion in the holder 50**.

A third form of holder 54 is illustrated in FIG. 5. The holder 54 is identical in all respects to the holder 10 described above, except that the rib 48 is eliminated and a second resilient strip 46 substituted instead. The second strip 46 is located in the same place as the deleted rib 48 and serves the same purpose, and also serves the further purpose of providing an additional bias against the cartridge sides to aid in resiliently supporting them in position.

The resilient support provided by any of the holders 10, 50, or 54 for the cartridges 12 eliminates rattling of the cartridges during normal movement of an automobile, for example, and firmly supports the cartridge while yet enabling a user to quickly insert or remove any one of the cartridges, as desired.

Various modifications and changes may be made with regard to the foregoing detailed description without departing from the spirit of the invention or the scope of the following claims.

I claim:

1. A tape cartridge holder for receiving a magnetic tape cartridge having substantially parallel sides, said holder comprising:
   a receptacle including a pair of sides defining a cartridge space therebetween for receiving a cartridge; and
   resilient means including an element having a base portion mounted to one of said sides of said receptacle adjacent the front edge thereof and further having an end portion projecting into said cartridge space from said base portion a distance such that said end portion is adapted to yieldably bend over toward the back of said cartridge space upon insertion of a cartridge into said cartridge space thereby to exert a bias upon said cartridge urging said cartridge toward the opposite side of said receptacle whereby said cartridge is resiliently supported between said sides of said receptacle and whereby said cartridge may be withdrawn from said receptacle by pulling upon said cartridge sufficiently to overcome the bias of said resilient means.

2. A tape cartridge holder according to claim 1 wherein said cartridge space is sufficiently large to accommodate a plurality of said cartridges; and
   said receptacle includes a rear wall having a plurality of ledges, each ledge being adapted to receive and support the back of one of said cartridges.

3. A tape cartridge holder according to claim 1 wherein said element is an elongated strip and said end portion is a yieldable blade thereof.

4. A tape cartridge holder according to claim 1 and including means located rearwardly of said element and defining a surface located inwardly of the surface to which said base portion is mounted for engagement with said one of said sides of said cartridge to guide said cartridge during insertion and withdrawal of said cartridge relative to said cartridge space.

5. A tape cartridge holder according to claim 4 wherein said means includes an inclined front edge defining a ramp engageable with the back corner of said cartridge to guide said cartridge into proper position within said cartridge space during insertion of said cartridge.

6. A tape cartridge holder for receiving a plurality of magnetic tape cartridges, each of which is generally rectangular in configuration, with substantially parallel sides, substantially parallel upper and lower faces, and substantially parallel front and back, said holder comprising:
   a receptacle including substantially parallel sides, substantially parallel top and bottom, and a rear wall sloping rearwardly from bottom to top, said sides having front edges substantially parallel to said rear wall, said sides, top, bottom, and rear wall defining a cartridge space for receiving a plurality of tape cartridges in vertically stacked, stair-step relation; and
   resilient means for yieldable engagement with one of the sides of each of said cartridges and including an elongated strip located adjacent one of said front edges, the resilience of said resilient means being sufficiently great that the bias exerted upon said cartridges resiliently supports said cartridges between said sides of said receptacle despite withdrawal of any one of said cartridges from said cartridge space.

References Cited

UNITED STATES PATENTS

| | | | |
|---|---|---|---|
| 416,030 | 11/1889 | Clapp | 312—332 |
| 2,499,623 | 3/1950 | Barnett | 312—20 |
| 3,430,774 | 3/1969 | Karkut | 211—50 |

JAMES A. LEPPINK, Primary Examiner

U.S. Cl. X.R.

211—50; 312—332